(No Model.)
A. McKELLAR.
AMALGAMATOR.
No. 254,675. Patented Mar. 7, 1882.
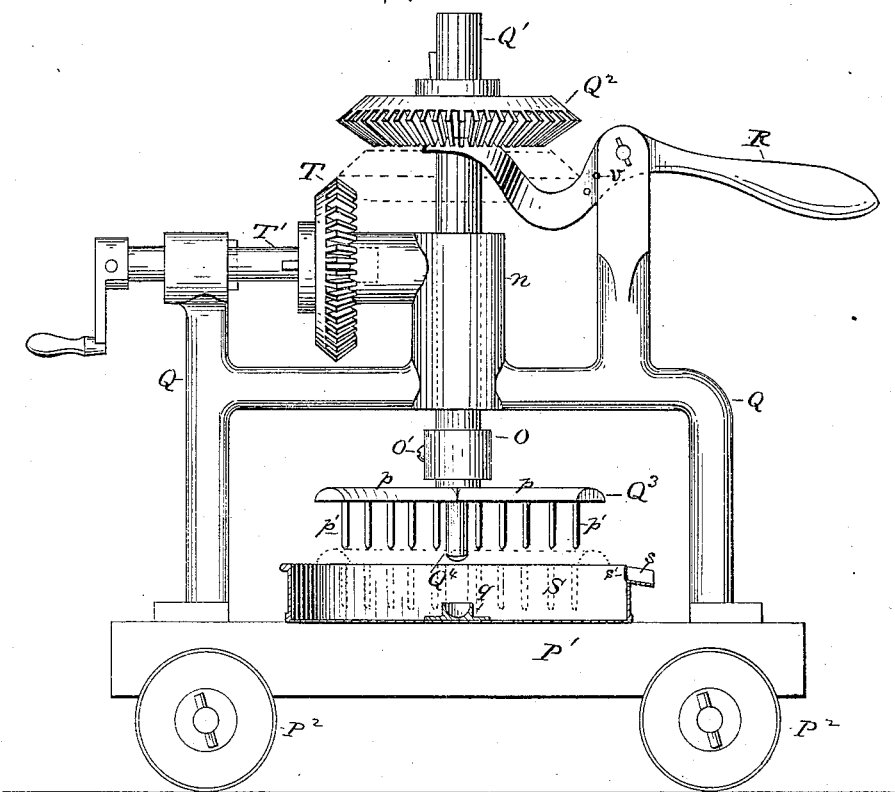
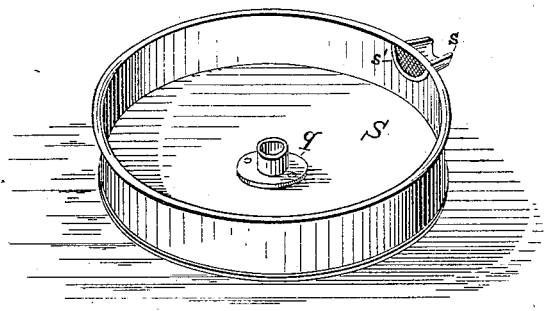
WITNESSES:
Thos Houghton.
Edw. W. Byrn.
INVENTOR:
A. McKellar
BY
ATTORNEYS.

UNITED STATES PATENT OFFICE.

ANGUS McKELLAR, OF FORT DOUGLASS, UTAH TERRITORY.

AMALGAMATOR.

SPECIFICATION forming part of Letters Patent No. 254,675, dated March 7, 1882.

Application filed December 5, 1881. (No model.)

To all whom it may concern:

Be it known that I, ANGUS McKELLAR, of Fort Douglass, Utah Territory, have invented a new and Improved Amalgamator; and I do hereby declare that the following is a full, clear, and exact description of the same, reference being had to the accompanying drawings, forming part of this specification, in which—

Figure 1 is a side elevation with the rake raised, and showing in dotted lines the position of the rake when let down into the pan. Fig. 2 is a perspective view of the pan.

My invention relates to an improved machine for amalgamating ores for the separation of the precious metals from the waste mineral matters; and it consists in a frame carrying a circular pan, combined with a horizontally-revolving rake fixed upon the lower end of a vertical shaft, which shaft rotates in a vertical bearing and carries a horizontal bevel-wheel adapted to rest above and engage with another bevel-wheel on a horizontal shaft, the said vertical rake-shaft being arranged to slide perpendicularly upward to disconnect its bevel-wheel from the other driving-wheel, and at the same time to lift the horizontal rake out of the pan.

The invention also consists in the peculiar construction of the frame-work, in combination with the aforementioned parts, a detachable pan provided with a step for the vertical shaft, and a lever for lifting the vertical shaft with its gear-wheel and rake, as will be hereinafter more fully described.

$P'$ is a platform, that is preferably mounted on wheels $P^2$, whereby the amalgamator may be moved about at will.

The settling and amalgamating part of the device consists of a double standard, Q, supporting in a central sleeve, $n$, an upright vertically-adjustable shaft, $Q'$, on the top of which is keyed a bevel-gear wheel, $Q^2$, and in a socket, O, on the bottom of which is held, by a set-screw, $O'$, a rake, $Q^3$, consisting of cross-bars $p$, having fixed in them downward-projecting teeth $p'$.

In an upright arm of the standard Q is pivoted a lever, R, whose forked end embraces the shaft $Q'$ just below the wheel $Q^2$, whereby said shaft and rake $Q' Q^3$ can be elevated above the settling and amalgamating pan S, and the bevel-wheel $Q^2$ be thereby ungeared from the bevel-wheel T, that is keyed on the horizontal crank-shaft $T'$, which is journaled on standard Q, and through which power is applied for operating the rake $Q^3$.

Set loosely upon platform $P'$ is the settling and amalgamating pan S, having fixed in its center a step, $q$, to receive the lower end, $Q^4$, of the rake-shaft when the rake $Q^3$ is in operation.

Secured to the upper edge of the rim of pan S is a discharge-spout, $s$, for the purpose of carrying off muddy water and light sand, over the inner end of which spout $s$ is a sieve or screen, $s'$, to prevent the escape of the larger particles of sand or metal during the amalgamating process.

The auriferous sand, earth, or ore, being reduced to a powder, is delivered into the pan S. This pan S is designed to be about three feet six inches in diameter and from nine to twelve inches deep, and is to contain from one-eighth to one-fourth inch of quicksilver when ready for work, and during the amalgamating process sulphate of copper and common salt or other suitable chemicals for facilitating the process will be added from time to time as conditions require. The powdered sand then being delivered into the pan S, containing the quicksilver, a small jet of water from, say, a one-fourth-inch pipe is also introduced at the center of the said pan S, and the rake $Q^3$ turned by means of the crank-shaft $T'$ until the materials in said pan S have been mixed to the consistency of thin mud or mush. Then the supply of powdered sand to the pan S is shut off, but the supply of water continued, and the rake $Q^3$ rotated in opposite directions until muddy water ceases to flow out of the spout $s$. By this time the upper layers of sand or ore in the pan S are free from gold, all or most of the particles of gold having by gravity worked down to the quicksilver and been therewith amalgamated. The rake $Q^3$ is then elevated by means of the lever R, and held suspended by passing a pin, $v$, through a corresponding hole through said lever R near the upright standard arm, in which the latter is pivoted. Then the operator skims off and throws away the upper layers of the sand or ore that are free from gold. More ore or sand is then supplied from the mill, and the rake $Q^3$ is then lowered and rotated again for further agitating the mass, and then raised again, while the operator removes more of the surface, sand, or ore, and so the operations or manipulations are successively repeated until the cleaning up at the close of the day's work. Then the washing and skimming are several times repeated, so as to skim or remove the sand close to the quicksilver. Then the pan S is removed and its contents taken out and submitted to the usual operations for separating and saving both the gold and the quicksilver.

With this apparatus but a very small amount of water is required—say about one hundred gallons of water for thirty to fifty tons of sand or gravel passed through the machine. This quantity of water can be easily brought on mule-back for several miles, and the water flowing from the pan can be arrested in settling-pans and used over again after it has deposited its sediment. Hence it will be seen that this process and apparatus can be used with good effect at many mines or places that are unworked because of an insufficient supply of water to operate the ordinary stamps and pans.

I am aware of the Patents Nos. 185,921 and 241,045; but in each of these cases the vertical wheel on the horizontal shaft has to be first adjusted by a separate lever away from the horizontal wheel on the vertical shaft before the vertical shaft with its rake can be raised, and which latter is effected by a separate movement. In my invention it will be seen that I preserve the drive-wheel T in a fixed position as regards its plane, which permits of a better transmission of motive power, and by fixing the horizontal wheel $Q^2$ above wheel T and rigidly on the vertical shaft, with nothing to preclude its upward movement, I secure the disconnection of the gears $Q^2$ and T simultaneously with the elevation of the rake and by the same movement, thus dispensing with the lever which is ordinarily employed for shifting the wheel T and securing a double function for the lever R.

Having thus described my invention, what I claim as new is—

1. An amalgamating device consisting of a pan, a frame-work carrying a horizontal shaft, with rigid vertical gear-wheel T, and adjustable vertical shaft O, with a rake at its lower end and single gear-wheel $Q^2$ at the top, resting above the wheel T, and means, substantially as described, for simultaneously raising the rake and disconnecting the gears by one and the same movement, as set forth.

2. The combination of the platform P', the detachable pan S, frame Q, horizontal shaft T', with rigid vertical gear-wheel T, vertically-adjustable shaft O, with rake $Q^3$ at its lower end and a gear-wheel, $Q^2$, at the top, resting above gear-wheel T, and the lever R, fulcrumed on a standard from the frame Q, and having its end arranged beneath the wheel $Q^2$, for simultaneously disconnecting the gears and raising the rake, substantially as shown and described.

ANGUS McKELLAR.

Witnesses:
 JOS. F. SIMMONS,
 A. STAYNER, Jr.